US012333683B2

(12) United States Patent
Li

(10) Patent No.: US 12,333,683 B2
(45) Date of Patent: Jun. 17, 2025

(54) IMAGE CONTENT EXTRACTION METHOD AND APPARATUS, TERMINAL, AND STORAGE MEDIUM

(71) Applicant: GUANGDONG GENIUS TECHNOLOGY CO., LTD., Dongguan (CN)

(72) Inventor: Hao Li, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 57 days.

(21) Appl. No.: 18/397,979

(22) Filed: Dec. 27, 2023

(65) Prior Publication Data

US 2024/0127404 A1    Apr. 18, 2024

Related U.S. Application Data

(63) Continuation of application No. PCT/CN2021/119724, filed on Sep. 22, 2021.

(30) Foreign Application Priority Data

Aug. 16, 2021 (CN) .......................... 202110938232.1

(51) Int. Cl.
*G06T 5/50* (2006.01)
*G06T 5/20* (2006.01)
(Continued)

(52) U.S. Cl.
CPC .................. *G06T 5/50* (2013.01); *G06T 5/20* (2013.01); *G06T 5/70* (2024.01); *G06T 5/73* (2024.01);
(Continued)

(58) Field of Classification Search
CPC .................................. G06T 5/50; G06V 10/60
See application file for complete search history.

(56) References Cited

U.S. PATENT DOCUMENTS

| 8,824,752 B1 | 9/2014 | Fonte et al. |
| 10,950,305 B1 | 3/2021 | Seiler |

(Continued)

FOREIGN PATENT DOCUMENTS

| CN | 102881011 A | 1/2013 |
| CN | 106228516 A | 12/2016 |

(Continued)

OTHER PUBLICATIONS

Baird, Digital Libraries and Document Image Analysis, Proceedings of the Seventh International Conference on Document Analysis and Recognition (ICDAR'03), pp. 2-14, dated Aug. 3, 2003.

(Continued)

*Primary Examiner* — Yi Yang
(74) *Attorney, Agent, or Firm* — Westbridge IP LLC

(57) ABSTRACT

Disclosed are an image content extraction method and an image content extraction apparatus, a terminal, and a storage medium. The image content extraction method includes acquiring an image to be processed. Performing high-contrast retention on the image to be processed to obtain a high-contrast image of the image to be processed. Performing image fusion on the image to be processed and the high-contrast image to obtain a fused image. Performing linear light enhancement on the fused image to obtain a linear light-enhanced image. And using first pixel points, having pixel values located within a preset pixel value range, in the linear light-enhanced image as an image content of the image to be processed. The present disclosure can improve the integrity of image content extraction.

6 Claims, 7 Drawing Sheets

(51) Int. Cl.
  *G06T 5/70* (2024.01)
  *G06T 5/73* (2024.01)
  *G06T 5/90* (2024.01)
  *G06V 10/60* (2022.01)

(52) U.S. Cl.
  CPC .............. *G06T 5/90* (2024.01); *G06V 10/60* (2022.01); *G06T 2207/20221* (2013.01)

(56) References Cited

U.S. PATENT DOCUMENTS

| | | | |
|---|---|---|---|
| 2005/0063586 | A1 | 3/2005 | Munsil et al. |
| 2007/0104384 | A1* | 5/2007 | Shaw .................. H04N 1/6013 382/254 |
| 2014/0126835 | A1* | 5/2014 | Shioya ..................... G06T 5/94 382/274 |
| 2014/0153793 | A1 | 6/2014 | Goharrizi et al. |
| 2015/0145882 | A1* | 5/2015 | Nguyen ............... A45D 44/005 345/589 |
| 2017/0330348 | A1* | 11/2017 | Park ......................... G06T 7/90 |
| 2018/0069996 | A1* | 3/2018 | Shukla .................. H04N 23/71 |
| 2020/0058111 | A1* | 2/2020 | Wang ...................... H04N 9/67 |

FOREIGN PATENT DOCUMENTS

| | | |
|---|---|---|
| CN | 107566740 A | 1/2018 |
| CN | 108289176 A | 7/2018 |
| CN | 109190632 A | 1/2019 |
| CN | 109461186 A | 3/2019 |
| CN | 110163211 A | 8/2019 |
| CN | 110598560 A | 12/2019 |
| CN | 110675336 A | 1/2020 |
| CN | 111027556 A | 4/2020 |
| CN | 111915478 A | 11/2020 |
| CN | 112215768 A | 1/2021 |
| CN | 112508816 A | 3/2021 |
| CN | 112967207 A | 6/2021 |
| EP | 4345741 A1 | 4/2024 |

OTHER PUBLICATIONS

Extended European Search Report issued in counterpart European Patent Application No. 21953917.8, dated Aug. 30, 2024.
Notification to Grant Patent Right for Invention issued in counterpart Chinese Patent Application No. 202110938232.1, dated Dec. 17, 2024.
Chang et al., A Retinex Image Enhancement Algorithm Based on Image Fusion Technology, Computer Engineering & Science, 2018, vol. 40, No. 9, pp. 1624-1635, dated Sep. 15, 2018.
First Office Action issued in counterpart Chinese Patent Application No. 202110938232.1, dated May 9, 2024.
International Search Report issued in corresponding PCT Application No. PCT/CN2021/119724 , dated Apr. 27, 2022.
Xu, Research on X-ray Image Enhancement Algorithm Based on Multi-scale and Histogram Equalization, Master' s Thesis submitted to Xi'an Technological University, dated Feb. 15, 2016.
Zhang, In Situ Image Segmentation Using the Convexity of Illumination Distribution of the Light Sources, IEEE Transactions on Pattern Analysis and Machine Intelligence, 2008, vol. 30, No. 10, pp. 1786-1799, dated Aug. 19, 2008.

* cited by examiner

FIG. 2

Use vertical calculation:

1. Xiaoming has 5 balloons, each of which costs 3.6 yuan. How much does it cost in total?

2. An area of a square is 25 cm2. What is a side length of the square?

3. There are nine birds in total. How many feet in total are there?

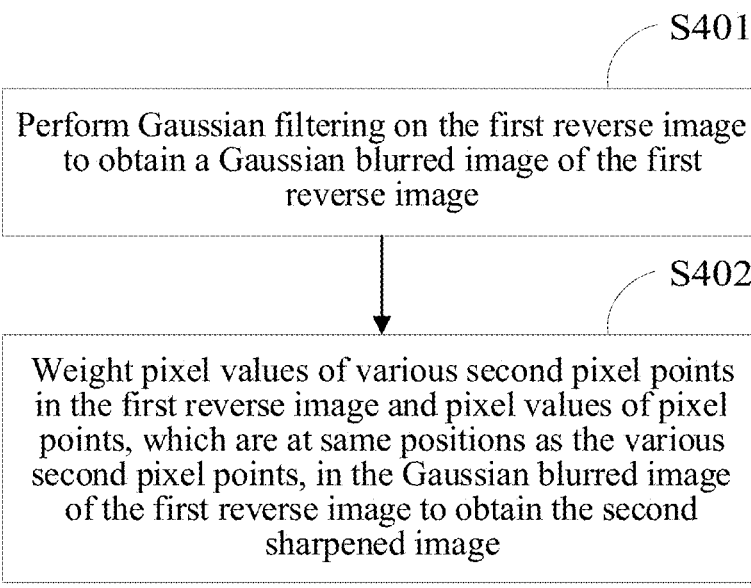

FIG. 3

```
                                    ┌─ S401
┌─────────────────────────────────────┐
│ Perform Gaussian filtering on the first reverse image
│ to obtain a Gaussian blurred image of the first
│ reverse image
└─────────────────────────────────────┘
                  │
                  ▼            ┌─ S402
┌─────────────────────────────────────┐
│ Weight pixel values of various second pixel points
│ in the first reverse image and pixel values of pixel
│ points, which are at same positions as the various
│ second pixel points, in the Gaussian blurred image
│ of the first reverse image to obtain the second
│ sharpened image
└─────────────────────────────────────┘
```

FIG. 4

Use vertical calculation:

1. Xiaoming has 5 balloons, each of which costs 3.6 yuan. How much does it cost in total?

2. An area of a square is 25 cm2. What is a side length of the square?

3. There are nine birds in total. How many feet in total are there?

Use vertical calculation:

60 ÷ 2 =          11 × 3 =          6 × 9 =
99 ÷ 6 =          38 × 1 =          77 × 1 =

1. Xiaoming has 5 balloons, each of which costs 3.6 yuan. How much does it cost in total?

2. An area of a square is 25 cm2. What is a side length of the square?

3. There are nine birds in total. How many feet in total are there?

FIG. 7

Use vertical calculation:

60 ÷ 2 =          11 × 3 =          6 × 9 =          7 × 3 =
99 ÷ 6 =          38 × 1 =          77 × 1 =          14 ÷ 3 =

1. Xiaoming has 5 balloons, each of which costs 3.6 yuan. How much does it cost in total?

2. An area of a square is 25 cm2. What is a side length of the square?

3. There are nine birds in total. How many feet in total are there?

FIG. 8

Use vertical calculation:

68÷2 =        11×3 =        6×9 =        7×3 =

99÷6 =        38×4 =        77×1 =       14÷3 =

1. Xiaoming has 5 balloons, each of which costs 3.6 yuan. How much does it cost in total?

2. An area of a square is 25 cm2. What is a side length of the square?

3. There are nine birds in total. How many feet in total are there?

IMAGE CONTENT EXTRACTION METHOD AND APPARATUS, TERMINAL, AND STORAGE MEDIUM

CROSS-REFERENCE TO RELATED APPLICATIONS

This application is a continuation of International Application No. PCT/CN2021/119724, filed on Sep. 22, 2021, which claims priority to Chinese Patent Application No. CN202110938232.1, filed on Aug. 16, 2021. All of the aforementioned applications are incorporated herein by reference in their entireties.

TECHNICAL FIELD

The present disclosure belongs to the field of image processing, and in particular, to an image content extraction method and an image content extraction apparatus, a terminal, and a storage medium.

BACKGROUND

Current hardware products used for tutoring students in learning are becoming increasingly diverse, one of which is a writing tablet. The writing tablet can record characters, graffiti, and the like written by a student during calculations and drawing on the writing tablet. The writing tablet or a device connected to the writing tablet can extract an image content for data analysis by using an image of the writing tablet, so as to achieve an effect of assisting the student in learning and education.

At present, a common image content extraction scheme generally uses threshold segmentation to segment and obtain the image content in the image. In practical applications, students do not apply a uniform force when performing mathematical calculations and drawing on the writing tablet, and pixel values of pixel points corresponding to the image contents such as characters and graffiti do not all fall within a certain threshold range. Therefore, the threshold segmentation scheme often leads to incomplete extraction of the image contents and breakage of the image contents.

SUMMARY

The embodiments of the present disclosure provide an image content extraction method and an image content extraction apparatus, a terminal, and a storage medium, which can improve the integrity of image content extraction.

In the first aspect, the present disclosure provides an image content extraction method, including:
acquiring an image to be processed;
performing high-contrast retention on the image to be processed to obtain a high-contrast image of the image to be processed;
performing image fusion on the image to be processed and the high-contrast image to obtain a fused image;
performing linear light enhancement on the fused image to obtain a linear light-enhanced image; and
using first pixel points, having pixel values located within a preset pixel value range, in the linear light-enhanced image as an image content of the image to be processed.

In the second aspect, the present disclosure provides an image content extraction apparatus, including:
an image acquisition unit, configured to acquire an image to be processed;
a high-contrast retention unit, configured to perform high-contrast retention on the image to be processed to obtain a high-contrast image of the image to be processed;
an image fusion unit, configured to perform image fusion on the image to be processed and the high-contrast image to obtain a fused image;
a linear light enhancement unit, configured to perform linear light enhancement on the fused image to obtain a linear light-enhanced image; and
an image content extraction unit, configured to use first pixel points, having pixel values located within a preset pixel value range, in the linear light-enhanced image as an image content of the image to be processed.

In the third aspect, the present disclosure provides a terminal, including a memory, a processor, and a computer program stored in the memory and runnable on the processor, wherein when executing the computer program, the processor implements the steps of the method described above.

In the fourth aspect, the present disclosure provides a computer-readable storage medium, wherein the computer-readable storage medium stores a computer program, and the computer program, when executed by a processor, implements the steps of the method described above.

In the fifth aspect, the present disclosure provides a computer program product, wherein the computer program product, when run on a terminal, causes the terminal to implement steps of a method.

In the implementations of the present disclosure, by acquiring an image to be processed, performing high-contrast retention on the image to be processed to obtain a high-contrast image of the image to be processed, then performing image fusion on the image to be processed and the high-contrast image to obtain a fused image, and performing linear light enhancement on the fused image to obtain a linear light-enhanced image, a pixel value difference between a pixel region corresponding to an image content in the image to be processed and a pixel region corresponding to a non-image content can be enhanced, and information of the image content in the image is highlighted, so that first pixel points, having pixel values within a preset pixel value range, in the linear light-enhanced image are used as the image content of the image to be processed, and the integrity of image content extraction is higher.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

FIG. 2 is a schematic diagram of an original image according to an embodiment of the present disclosure.

FIG. 3 is a schematic diagram of a first reverse image according to an embodiment of the present disclosure.

FIG. 4 is a flowchart of specific implementation of sharpening a first reverse image according to an embodiment of the present disclosure.

FIG. 5 is a schematic diagram of a second sharpened image according to an embodiment of the present disclosure.

FIG. 6 is a schematic diagram of a high-contrast image according to an embodiment of the present disclosure.

FIG. 7 is a schematic diagram of a fused image according to an embodiment of the present disclosure.

FIG. 8 is a schematic diagram of an image content according to an embodiment of the present disclosure.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure, and all other embodiments obtained by ordinary technicians in the field on the premise of not doing creative work belong to the protection range of the present disclosure.

Current hardware products used for tutoring students in learning are becoming increasingly diverse, one of which is a writing tablet. A writing tablet can record characters, graffiti, and the like written by a student during calculations and drawing on the writing tablet. The writing tablet or a device connected to the writing tablet can extract an image content for data analysis by using an image of the writing tablet, so as to achieve an effect of assisting the student in learning and education.

At present, a common image content extraction scheme generally uses threshold segmentation to segment and obtain the image content in the image. In practical applications, students do not apply a uniform force when performing mathematical calculations and drawing on the writing tablet, and pixel values of pixel points corresponding to the image contents such as characters and graffiti do not all fall within a certain threshold range. Therefore, the threshold segmentation scheme often leads to incomplete extraction of the image contents and breakage of the image contents.

To illustrate the technical solutions of the present disclosure, specific embodiments will be provided below for explanation.

Figure 1:
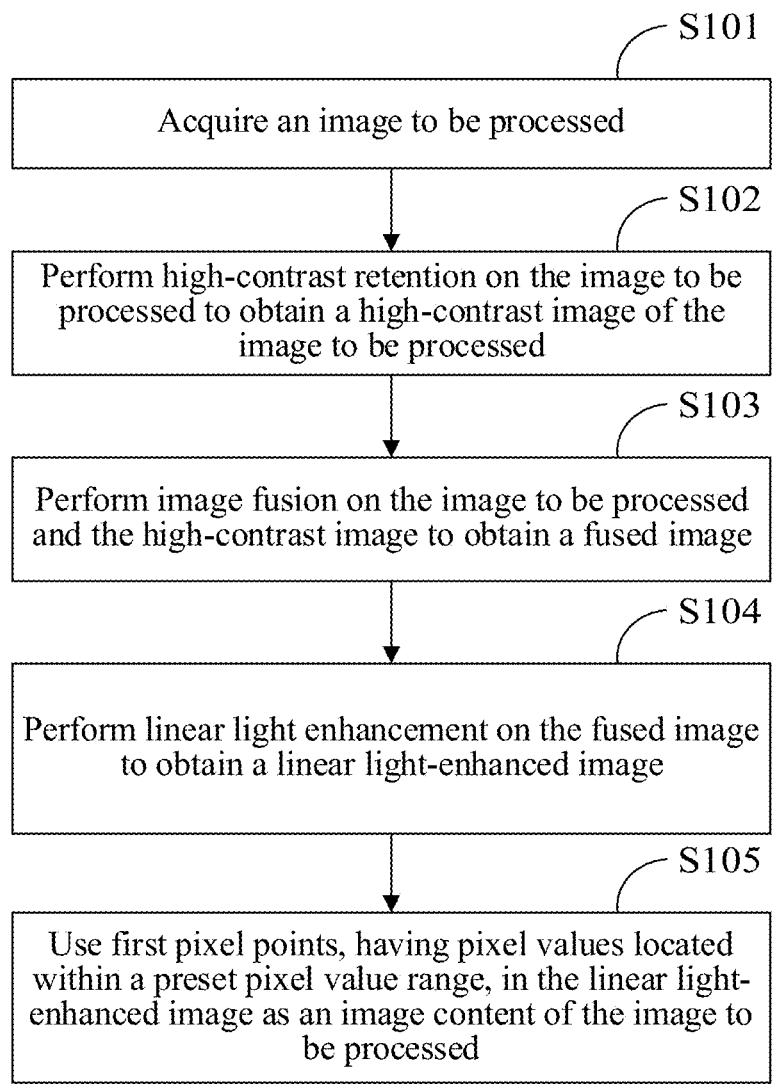
FIG. 1 is a flowchart of an implementation of an image content extraction method according to an embodiment of the present disclosure.

FIG. 1 shows a schematic diagram of an implementation process of an image content extraction method according to an embodiment. The method can be applied to a terminal and can be applied to a situation where the integrity of image content extraction needs to be improved.

The terminal described above can be a writing tablet with a certain processing capability, a terminal device connected to writing tablet, or another terminal device that needs to extract characters from an image.

Specifically, the image content extraction method mentioned above can include steps S101 to S105.

Step S101, an image to be processed is acquired.

The image to be processed refers to an image containing characters, graffiti, and other image contents that needs to be extracted. In the implementations of the present disclosure, different character images to be processed can be selected according to an actual situation.

In some implementations of the present disclosure, the terminal can acquire an original image obtained by taking a picture of a writing tablet, reverse the original image to obtain a first reverse image of the original image, sharpen the first reverse image, and use a second sharpened image obtained after sharpening as the image to be processed.

Specifically, the reversing of the original image can include: subtracting pixel values of various pixel points in the original image from a set pixel value to obtain the first reverse image of the original image. The set pixel value described above can be 255, that is, for each pixel point in the original image, an original pixel value of the pixel point in the original image is subtracted from 255 to obtain a pixel value of the pixel point in the first reverse image.

FIG. 2 shows the original image obtained by taking a picture of the writing tablet in the present disclosure. The first reverse image corresponding to the original image is as shown in FIG. 3.

In order to make edges of blurred characters in the first reverse image clearer, after the first reverse image is obtained, the first reverse image can be sharpened. Specifically, as shown in FIG. 4, the sharpening of the first reverse image can include following steps S401 to S402.

Step S401, Gaussian filtering is performed on the first reverse image to obtain a Gaussian blurred image of the first reverse image.

Specifically, the above Gaussian filtering is an image blurring algorithm that can make each pixel point in the output Gaussian blurred image be a weighted sum of the corresponding pixel point on the original image and the surrounding pixel points on the basis of a Gaussian template (convolution kernel).

The present disclosure does not limit a specific method of Gaussian filtering, and in some embodiments of the present disclosure, the Gaussian filtering can be achieved by bilateral filtering. More specifically, the Gaussian filtering can be achieved through a bilateral filtering function provided by OpenCV, wherein a parameter kernel size of the bilateral filtering function can be set to be 11, that is, a size of the Gaussian template (convolution kernel) can be 11. A parameter sigmaColor and a parameter sigmaSpace of the bilateral filtering function can be set to be 0, that is, a standard deviation of a color space and a standard deviation of a coordinate space are both 0.

Step S402, pixel values of various second pixel points in the first reverse image and pixel values of pixel points, which are at the same positions as the various second pixel points, in the Gaussian blurred image of the first reverse image are weighted to obtain the second sharpened image.

Specifically, in some embodiments of the present disclosure, products of the pixel values of the various second pixel points in the first reverse image and a first weight value can be calculated, and products of the pixel values of the pixel points, which are at the same positions as the various second pixel points, in the Gaussian blurred image of the reverse image can be calculated. Then, the products of the pixel values of the various second pixel points in the first reverse image and the first weight value, and the products of the pixel values of the pixel points, which are at the same positions as the various second pixel points, in the Gaussian blurred image of the first reverse image and the second weight value are added together to obtain the second sharpened image.

That is, the pixel value of a pixel point in the second sharpened image is obtained by adding the product of the pixel value of a pixel point, which is at the same position, in the first reverse image and the first weight value with the product of the pixel value of a pixel point, which is at the same position, in the Gaussian blurred image and the second weight value.

Specific values of the first weight value and the second weight value mentioned above can be adjusted according to an actual situation. In some implementations of the present disclosure, the first weight value may be 2, and the second weight value may be −1.

FIG. 5 shows the second sharpened image obtained by sharpening the first reverse image shown in FIG. 3.

In some other implementations of the present disclosure, the terminal can also acquire an original image obtained by taking a picture of a writing tablet, sharpen the original image, and use a first sharpened image obtained after sharpening as the image to be processed.

The process of sharpening the original image can refer to the description of the process of sharpening the first reverse image and will not be elaborated in the present disclosure.

It should be noted that in the implementations of the present disclosure, the terminal can select one of the two methods on the basis of a material of the writing tablet and a color of characters on the writing tablet to obtain the sharpened image and uses the sharpened image as a character image to be processed.

In practical applications, a camera may possibly frame a background beyond the writing tablet within the original image when taking a picture of the writing tablet, that is, only a part of a pixel region in the original image is a pixel region corresponding to the writing tablet. Therefore, for ease of subsequent processing, in order to avoid noise in extracted characters, in some implementations of the present disclosure, after the original image obtained by taking a picture of the writing tablet is obtained, image recognition can be performed on the original image to obtain a pixel region, corresponding to the writing tablet, in the original image; and perspective transformation is performed on the pixel region corresponding to the writing tablet to obtain a writing tablet image.

That is, in some other implementations of the present disclosure, the terminal can also acquire an original image obtained by taking a picture of a writing tablet; perform image recognition on the original image to obtain a pixel region, corresponding to the writing tablet, in the original image; perform perspective transformation on the pixel region corresponding to the writing tablet to obtain a writing tablet image; and sharpen the writing tablet image, and use a third sharpened image obtained after sharpening as the image to be processed; or, acquire an original image obtained by taking a picture of a writing tablet; perform image recognition on the original image to obtain a pixel region, corresponding to the writing tablet, in the original image; perform perspective transformation on the pixel region corresponding to the writing tablet to obtain a writing tablet image; reverse the writing tablet image to obtain a second reverse image of the writing tablet image; and sharpen the perspective transformation, and use a fourth sharpened image obtained after sharpening as the image to be processed.

Specifically, the present disclosure does not limit a specific method of image recognition. In some implementations of the present disclosure, the terminal can input the original image to a pre-trained writing tablet recognition model, and the writing tablet recognition model outputs the pixel region, corresponding to the writing tablet, in the original image.

The writing tablet recognition model can be a YOLO model.

Specifically, in some implementations of the present disclosure, a training process of the writing tablet recognition model may include: acquiring a sample image set which includes a plurality of original sample images obtained by taking a picture of the writing tablet. Meanwhile, working staff can pre-mark the pixel region, corresponding to the writing tablet, in each original image. The training process further includes: selecting target training samples from the sample image set; inputting each target training sample to a network model to be trained; acquiring the pixel region output by the network model to be trained and corresponding to the writing tablet; counting the accuracy of the network model to be trained on the basis of the pre-marked pixel region corresponding to the writing tablet; if the accuracy of the network model to be trained is less than an accuracy threshold, adjusting parameters in the network model to be trained, and re-executing the step of selecting target training samples from the sample image set and the subsequent steps until the accuracy of the network model to be trained is greater than or equal to the accuracy threshold, thus obtaining the writing tablet recognition model.

In this case, the terminal can acquire the pixel region, corresponding to the writing tablet, in the original image by using the trained writing tablet recognition model.

After the pixel region, corresponding to the writing tablet, in the original image is acquired, in some implementations of the present disclosure, the terminal can perform perspective transformation on the pixel region corresponding to the writing tablet to obtain the writing tablet image. The perspective transformation refers to projecting the pixel region corresponding to the writing tablet to a new visual plane to obtain the writing tablet image, which can correct the pixel region corresponding to the writing tablet in the original image and avoid interference of information, beyond a writing tablet region, in the original image on an image content extraction unit.

Step S102, high-contrast retention is performed on the image to be processed to obtain a high-contrast image of the image to be processed.

In the implementations of the present disclosure, since there is a certain difference in pixel values of a pixel region corresponding to a character in the character image to be processed and a pixel region beyond the character, the terminal can highlight boundary information of the character in the character image to be processed through the high-contrast retention.

In some implementations of the present disclosure, high-contrast retention is performed on the character image to be processed, which can specifically include: performing Gaussian filtering on the character image to obtain a Gaussian blurred image of the character image to be processed; and for a pixel point of a certain position of the character image to be processed, determining a pixel value of a pixel point, which is located at the same position as the pixel point, in the high-contrast image on the basis of a pixel value of the pixel point, a pixel value of a pixel point, which is located at the same position as the pixel point, in the Gaussian blurred image, and a set pixel value. The set pixel value can be adjusted according to an actual situation. In some implementations of the present disclosure, the set pixel value can be 127.

More specifically, the pixel value of a certain pixel point in the high-contrast image is a value obtained by subtracting the pixel value of a pixel point, which is located at the same position, in the character image to be processed from the pixel value of a pixel point, which is located at the same position, in the Gaussian blurred image to obtain a difference value, and then adding the difference value to the set pixel value.

FIG. 6 shows a high-contrast image obtained by performing the high-contrast retention on the image to be processed shown in FIG. 5.

In the implementations of the present disclosure, the Gaussian blurred image obtained by smoothing the image to be processed can be mixed with the high-frequency image to be processed through the high-contrast retention, which can retain edge information in the image to be processed, that is, highlight the boundary information of the character in the image to be processed.

Step S103, image fusion is performed on the image to be processed and the high-contrast image to obtain a fused image.

Specifically, the above image fusion refers to adding the pixel value of a certain pixel point in the character image to be processed and the pixel value of a pixel point, which is located at the same position as the pixel point, in the high-contrast image to obtain the pixel value of a pixel point, which is located at the same position as the pixel point, in the fused image.

Step S104, linear light enhancement is performed on the fused image to obtain a linear light-enhanced image.

In some implementations of the present disclosure, the linear light enhancement described above specifically includes: normalizing various third pixel points in the fused image to obtain first normalized pixel values corresponding to the various third pixel points; determining linear light values of various fourth pixel points; and respectively adding the first normalized pixel values of the various fourth pixel points in the fused image with the linear light values corresponding to the various fourth pixel points to obtain the linear light-enhanced image. Each of the various fourth pixel points is a third pixel point, having the first normalized pixel value located within a preset value range, among the various third pixel points.

In some implementations of the present disclosure, the linear light value of each of the various fourth pixel points can be a linear light value calculated on the basis of the first normalized pixel value of the fourth pixel point and a second normalized pixel value of a pixel point, which is located at a same position as the fourth pixel point, in the high-contrast image. The linear light value can be used for enhancing the contrast of the fused image.

Specifically, the terminal can normalize the pixel values of the various third pixel points. For example, the pixel values of the various third pixel points can be divided by 255 to obtain the first normalized pixel values corresponding to the various third pixel points. The first normalized pixel values are all within [0, 1]. For a certain third pixel point, if its corresponding first normalized pixel value is not within the preset value range, the linear light value cannot be increased; if its corresponding first normalized pixel value is within the preset value range, the third pixel point is the fourth pixel point, and the terminal can also normalize the high-contrast image to obtain the second normalized pixel values of the various pixel points in the high-contrast image, and calculate the linear light value corresponding to the fourth pixel point on the basis of the first normalized pixel value corresponding to the fourth pixel point and the second normalized pixel value corresponding to the pixel point, which is located at the same position as the fourth pixel point, in the high-contrast image. The preset value range can be selected according to an actual situation. In some implementations of the present disclosure, the preset value range can be a value not exceeding 0.5.

More specifically, if its corresponding first normalized pixel value is within the preset value range, its corresponding linear light value is obtained by subtracting its first normalized pixel value from a product of the second normalized pixel value corresponding to the pixel point, which is located at the same position as the third pixel point, in the high-contrast image and 2, and then subtracting an obtained difference value from 1. It can be understood that the obtained linear light values are also normalized values.

In order to ensure that the pixel values in the obtained linear light-enhanced image do not exceed a reasonable range, in some implementations of the present disclosure, the respectively adding the first normalized pixel values of the various fourth pixel points in the fused image with the linear light values corresponding to the various fourth pixel points to obtain the linear light-enhanced image may specifically includes: respectively adding the first normalized pixel values of the various fourth pixel points in the fused image with the linear light values corresponding to the various fourth pixel points to obtain third normalized pixel values respectively corresponding to the various fourth pixel points; and performing value verification on the third normalized pixel values respectively corresponding to the various fourth pixel points, and determining, according to a verification result of the value verification, fourth normalized pixel values respectively corresponding to the various fourth pixel points to obtain the linear light-enhanced image.

Specifically, in some implementations of the present disclosure, the first normalized pixel values of the various fourth pixel points in the fused image can be respectively added with the linear light values corresponding to the various fourth pixel points to obtain third normalized pixel values respectively corresponding to the various fourth pixel points; value verification is performed on the third normalized pixel values respectively corresponding to the various fourth pixel points; if a verification result of the value verification indicates that the third normalized pixel value corresponding to a certain fourth pixel point is greater than 1, a first pixel value of the fourth pixel point is set to be 1; if the verification result of the value verification indicates that the third normalized pixel value corresponding to a certain fourth pixel point is less than 0, a first pixel value of the fourth pixel point is set to be 0; and if the verification result of the value verification indicates that the third normalized pixel value corresponding to a certain fourth pixel point is greater than or equal to 0 and less than or equal to 1, the third normalized pixel value corresponding to this pixel point is retained. Therefore, the terminal can determine, according to the verification result of the value verification, fourth pixel values respectively corresponding to the various fourth pixel points to obtain the linear light-enhanced image.

FIG. 7 shows the linear light-enhanced image obtained on the basis of the fused image obtained by fusing the image to be processed shown in FIG. 5 with the high-contrast image shown in FIG. 6.

In the implementations of the present disclosure, by means of the high-contrast retention, the image fusion, and the linear light enhancement, the difference in pixel value between the pixel region corresponding to the character and other pixel points can be widened, so that the pixel region corresponding to the character in the character image to be processed is enhanced.

Step S105, first pixel points, having pixel values located within a preset pixel value range, in the linear light-enhanced image are used as an image content of the image to be processed.

The preset pixel value range described above refers to a range of the pixel values of the pixel points corresponding to the image content.

In the implementations of the present disclosure, if the pixel value of a certain first pixel point in the linear light-enhanced image is within the preset pixel value range, it indicates that the first pixel point belongs to the pixel points corresponding to the image content; and if the pixel value of a certain first pixel point in the linear light-enhanced image is beyond the preset pixel value range, it indicates that the first pixel point does not belong to the pixel points corresponding to the image content.

Specifically, in some implementations of the present disclosure, the terminal may traverse the various first pixel points. If the pixel value of a certain first pixel point is beyond the preset pixel value range, the pixel value of the first pixel point is set to be 0 to eliminate the pixel point. If the pixel value of a certain first pixel point is within the preset pixel value range, the pixel value of the first pixel point is retained. After all the first pixel points in the linear light-enhanced image are traversed, the first pixel points within the preset pixel value range can be used as the image content of the image to be processed.

FIG. 8 shows the image content obtained after the linear light-enhanced image shown in FIG. 7 is processed.

It should be noted that the preset pixel value range can be adjusted according to an actual situation, namely, on the basis of different materials of writing tablets and different character colors. Specifically, the preset pixel value range can be determined on the basis of a large number of histograms, each of which counts the pixel values of the first pixel points in different linear light-enhanced images. In some implementations of the present disclosure, the preset pixel value range may be set to be greater than or equal to 230, that is, the normalized pixel values corresponding to the preset pixel value range are greater than or equal to 0.9.

In the implementations of the present disclosure, by acquiring an image to be processed, performing high-contrast retention on the image to be processed to obtain a high-contrast image of the image to be processed, then performing image fusion on the image to be processed and the high-contrast image to obtain a fused image, and performing linear light enhancement on the fused image to obtain a linear light-enhanced image, a pixel value difference between a pixel region corresponding to an image content in the image to be processed and a pixel region corresponding to a non-image content can be enhanced, and information of the image content in the image is highlighted, so that first pixel points, having pixel values within a preset pixel value range, in the linear light-enhanced image are used as the image content of the image to be processed, and the integrity of image content extraction is higher.

Moreover, compared to manually matting the image to be processed, the image content extraction method provided in the present disclosure can achieve a real-time and batch processing effect.

Further, the image content extraction method described above can also include: overlaying the image content of the character image to be processed onto a target background to obtain a target image, and displaying the target image.

The target background can be set according to a user requirement.

In some implementations of the present disclosure, the target background may be a background image with a pixel value of 255. For example, FIG. 9 shows the target image obtained by overlaying the image content shown in FIG. 8 onto the background image with the pixel value of 255.

In the implementations of the present disclosure, the terminal can obtain the target image by overlaying the image content of the image to be processed onto the target background. A color difference between the target background and the image content is generally significant, so that the image content in the obtained target image will be further highlighted. In this case, the terminal can display the target image to allow a user to better observe the image content.

It should be noted that for the various aforementioned method embodiments, for the sake of simplicity, they are all described as a series of action combinations. However, those skilled in the art should be aware that the present disclosure is not limited by the order of the described actions, as according to the present disclosure, certain steps can be performed in other orders.

Figures 9, 10:
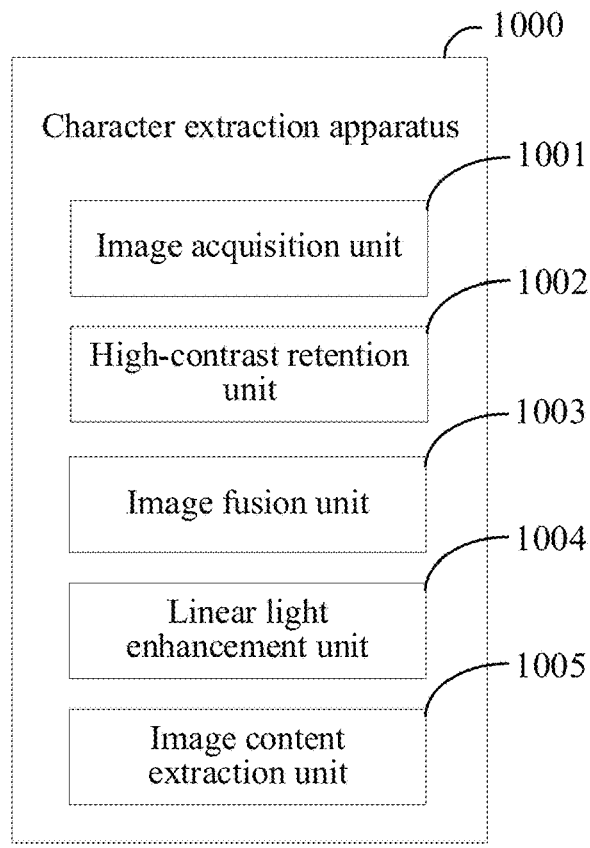
FIG. 9 is a schematic diagram of a target image according to an embodiment of the present disclosure.
FIG. 10 is a schematic structural diagram of an image content extraction apparatus according to an embodiment of the present disclosure.

FIG. 10 is a schematic structural diagram of an image content extraction apparatus 1000 according to an embodiment of the present disclosure. The image content extraction apparatus 1000 is configured on a terminal.

Specifically, the image content extraction apparatus 1000 can include:
an image acquisition unit 1001, configured to acquire an image to be processed;
a high-contrast retention unit 1002, configured to perform high-contrast retention on the image to be processed to obtain a high-contrast image of the image to be processed;
an image fusion unit 1003, configured to perform image fusion on the image to be processed and the high-contrast image to obtain a fused image;
a linear light enhancement unit 1004, configured to perform linear light enhancement on the fused image to obtain a linear light-enhanced image; and
an image content extraction unit 1005, configured to use first pixel points, having pixel values located within a preset pixel value range, in the linear light-enhanced image as an image content of the image to be processed.

In some other implementations of the present disclosure, the image acquisition unit 1001 can also be specifically configured to: acquire an original image obtained by taking a picture of a writing tablet, sharpen the original image, and use a first sharpened image obtained after sharpening as the image to be processed.

In some implementations of the present disclosure, the image acquisition unit 1001 can also be specifically configured to: acquire an original image obtained by taking a picture of a writing tablet, reverse the original image to obtain a first reverse image of the original image, sharpen the first reverse image, and use a second sharpened image obtained after sharpening as the image to be processed.

In some implementations of the present disclosure, the image acquisition unit 1001 can also be specifically configured to: perform Gaussian filtering on the first reverse image to obtain a Gaussian blurred image of the first reverse image; and weight pixel values of various second pixel points in the first reverse image and pixel values of pixel points, which are at same positions as the various second pixel points, in the Gaussian blurred image of the first reverse image to obtain the second sharpened image.

In some implementations of the present disclosure, the image acquisition unit 1001 can also be specifically configured to: acquire an original image obtained by taking a picture of a writing tablet; perform image recognition on the original image to obtain a pixel region, corresponding to the writing tablet, in the original image; perform perspective transformation on the pixel region corresponding to the writing tablet to obtain a writing tablet image; and sharpen the writing tablet image, and use a third sharpened image obtained after sharpening as the image to be processed.

In some implementations of the present disclosure, the image acquisition unit 1001 can also be specifically configured to: acquire an original image obtained by taking a picture of a writing tablet; perform image recognition on the original image to obtain a pixel region, corresponding to the writing tablet, in the original image; perform perspective transformation on the pixel region corresponding to the writing tablet to obtain a writing tablet image; reverse the writing tablet image to obtain a second reverse image of the writing tablet image; and sharpen the second reverse image, and use a fourth sharpened image obtained after sharpening as the image to be processed.

In some implementations of the present disclosure, the linear light value of each of the various fourth pixel points is a linear light value calculated on the basis of the first normalized pixel value of the fourth pixel point and a second normalized pixel value of a pixel point, which is located at a same position as the fourth pixel point, in the high-contrast image.

In some implementations of the present disclosure, the linear light enhancement unit 1004 can also be specifically configured to: respectively add the first normalized pixel values of the various fourth pixel points in the fused image with the linear light values corresponding to the various fourth pixel points to obtain third normalized pixel values respectively corresponding to the various fourth pixel points; and perform value verification on the third normalized pixel values respectively corresponding to the various fourth pixel points, and determine, according to a verification result of the value verification, fourth normalized pixel values respectively corresponding to the various fourth pixel points to obtain the linear light-enhanced image.

It should be noted that for convenience and conciseness of description, for specific working processes of the image content extraction apparatus 1000 described above, refer to the corresponding processes in the methods according to FIG. 1 to FIG. 9, and details are not described here again.

Figure 11:
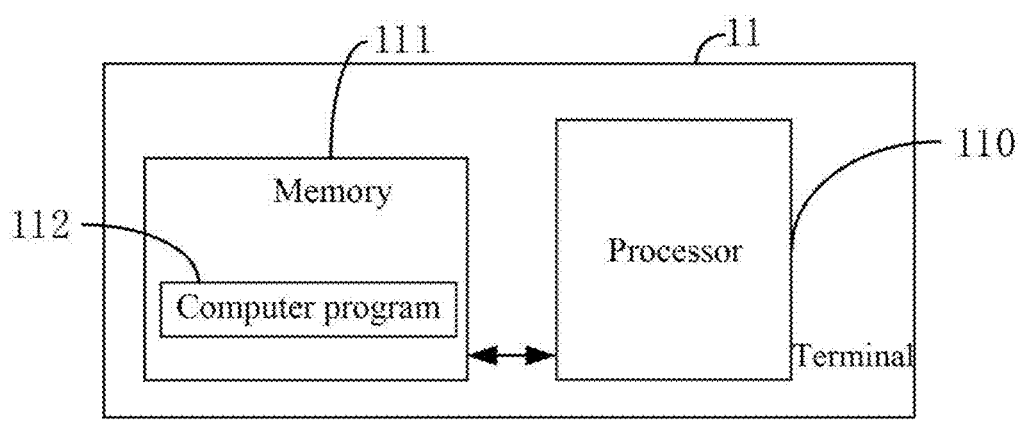
FIG. 11 is a schematic structural diagram of a terminal according to an embodiment of the present disclosure.

FIG. 11 is a schematic diagram of a terminal according to an embodiment of the present disclosure. The terminal can be a writing tablet with a certain processing capability, a terminal device connected to writing tablet, or another terminal device that needs to extract characters from an image.

Specifically, the terminal 11 may include: a processor 110, a memory 111, and a computer program 112 stored in the memory 111 and runnable on the processor 110, such as an image content extraction program. When the processor 110 executes the computer program 112, the steps in the various image content extraction method embodiments are implemented, such as steps S101 to S105 shown in FIG. 1. Or, when the processor 110 executes the computer program 112, the functions of the various modules/units in the foregoing apparatus embodiments, such as the image acquisition unit 1001, the high-contrast retention unit 1002, the image fusion unit 1003, the linear light enhancement unit 1004, and the image content extraction unit 1005 shown in FIG. 10.

The computer program can be divided into one or more modules/units, and the one or more modules/units are stored in the memory 111 and executed by the processor 110 to complete the present disclosure. The one or more modules/units can be a series of computer program instruction segments capable of completing specific functions. The instruction segments are configured to describe an execution process of the computer program in the terminal.

For example, the computer program is divided into: the image acquisition unit, the high-contrast retention unit, the image fusion unit, the linear light enhancement unit, and the image content extraction unit.

The various units have the following specific functions: The image acquisition unit is configured to acquire an image to be processed; the high-contrast retention unit is configured to perform high-contrast retention on the image to be processed to obtain a high-contrast image of the image to be processed; the image fusion unit is configured to perform image fusion on the image to be processed and the high-contrast image to obtain a fused image; the linear light enhancement unit is configured to perform linear light enhancement on the fused image to obtain a linear light-enhanced image; and the image content extraction unit is configured to use first pixel points, having pixel values located within a preset pixel value range, in the linear light-enhanced image as an image content of the image to be processed.

The terminal can include, but is not limited to, the processor 110 and the memory 111. A person skilled in the art can understand that FIG. 11 is only an example of the terminal and does not constitute a limitation on the terminal. It can include more or fewer components than those shown, or combinations of some components, or different components. For example, the terminal can also include an input and output device, a network access device, and a bus.

The processor 110 may be a Central Processing Unit (CPU), or may be other general-purpose processors, digital signal processors (DSPs), application-specific integrated circuits (ASICs), field-programmable gate arrays (FPGAs), or may be other programmable logic devices, discrete gates or transistor logic devices, and discrete hardware components. The general-purpose processor may be a microprocessor, or the processor may be any conventional processor, or the like.

The memory 111 can be an internal storage unit of the terminal, such as a hard disk drive or an internal memory of the terminal. The memory 111 may also be an external storage device of the terminal, such as a plug-in hard disk drive, a Smart Media Card (SMC), a Secure Digital (SD) card, or a flash card that is equipped on the terminal. Further, the memory 111 may also include both an internal storage unit of the terminal and an external storage device. The memory 111 is configured to store the computer program and other programs and data required by the terminal. The memory 111 can also be configured to temporarily store data that has been or is about to be output.

A person skilled in the art can clearly know that for ease and simplicity of description, division of all the above functional units and modules is exemplified only. In practical applications, the foregoing functions may be allocated to be completed by different functional units and modules as required, that is, an inner structure of the apparatus is divided into different functional units and modules, so as to complete all or some of the functions described above. The functional units and modules in the embodiments may be integrated into one processing unit, or each of the units may exist alone physically, or two or more units are integrated into one unit. The integrated unit described above may be implemented in the form of hardware or a software functional unit. In addition, the specific names of the various functional units and modules are only for the purpose of distinguishing them from each other and are not used to limit the protection scope of the present disclosure. For specific working processes of the units and modules in the system described above, refer to the corresponding processes in the foregoing method embodiments, and details are not described here again.

In the foregoing embodiments, the description of each embodiment has respective focuses. For a part that is not described in detail or recorded in an embodiment, reference may be made to related descriptions in other embodiments.

Those of skill in the art would recognize that the various illustrative units and algorithm steps described in connection with the embodiments disclosed herein may be implemented as electronic hardware, or combinations of computer software and electronic hardware. Whether these functions are implemented as hardware or software depends on particular application and design constraint conditions of the technical solutions. A person skilled in the art may use different methods to implement the described functions for various particular applications, but it should not be considered that the implementation goes beyond the scope of the present disclosure.

In the several embodiments provided in the present disclosure, it should be understood that the disclosed apparatuses/terminals and methods may be implemented in other manners. For example, the above-described apparatus/terminal embodiments are merely illustrative. For example, the division of the module/unit is only one type of logical functional division, and other divisions is achieved in practice. For example, multiple units or components can be combined or integrated into another system, or some features can be omitted, or not executed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. Some or all of the units are selected according to actual needs to achieve the objective of the solution of this embodiment.

In addition, functional units in embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated module/unit is implemented in the form of a software functional unit and sold or used as an independent product, the integrated unit may be stored in a computer-readable storage medium. Based on this understanding, the present disclosure implements all or part of the flows in the method of the above embodiments, and can also be completed by instructing relevant hardware through the computer program. The computer program can be stored in the computer-readable storage medium. When executed by the processor, the computer program can achieve the steps of the various method embodiments described above. The computer program includes computer program codes, and the computer program codes can be in the form of a source code, the form of an object code, an executable files, or some intermediate forms. The computer-readable media can include any entity or apparatus capable of carrying the computer program codes, a recording medium, a USB flash disk, a mobile hard disk drive, a magnetic disk, an optical disk, a computer memory, a Read-Only Memory (ROM), a Random Access Memory (RAM), an electrical carrier signal, a telecommunications signal, a software distribution medium, and the like. It should be noted that contents contained in the computer-readable medium can be appropriately added or reduced according to the requirements of legislation and patent practice in the jurisdiction. For example, in some jurisdictions, according to the legislation and patent practice, the computer-readable medium does not include electric carrier signals and telecommunication signals.

The various above embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure and is within the scope of protection claimed by the present disclosure.

What is claimed is:

1. An image content extraction method, comprising:
acquiring an image to be processed;
performing high-contrast retention on the image to be processed to obtain a high-contrast image of the image to be processed;
performing image fusion on the image to be processed and the high-contrast image to obtain a fused image;
performing linear light enhancement on the fused image to obtain a linear light-enhanced image; and
using first pixel points, having pixel values located within a preset pixel value range, in the linear light-enhanced image as an image content of the image to be processed;
wherein the performing linear light enhancement on the fused image to obtain a linear light-enhanced image comprises:
normalizing various third pixel points in the fused image to obtain first normalized pixel values corresponding to the various third pixel points;
determining linear light values of various fourth pixel points, wherein each of the various fourth pixel points is a third pixel point, having the first normalized pixel value located within a preset value range, among the various third pixel points; wherein the linear light value of each of the various fourth pixel points is a linear light value calculated on the basis of the first normalized pixel value of the fourth pixel point and a second normalized pixel value of a pixel point, which is located at a same position as the fourth pixel point, in the high-contrast image;
respectively adding the first normalized pixel values of the various fourth pixel points in the fused image with the linear light values corresponding to the various fourth pixel points to obtain third normalized pixel values respectively corresponding to the various fourth pixel points;
performing value verification on the third normalized pixel values respectively corresponding to the various fourth pixel points, and determining, according to a verification result of the value verification, fourth normalized pixel values respectively corresponding to the various fourth pixel points to obtain the linear light-enhanced image.

2. The image content extraction method according to claim 1, wherein the acquiring an image to be processed comprises:
   acquiring an original image obtained by taking a picture of a writing tablet, sharpening the original image, and using a first sharpened image obtained after sharpening as the image to be processed; or
   acquiring an original image obtained by taking a picture of a writing tablet, reversing the original image to obtain a first reverse image of the original image, sharpening the first reverse image, and using a second sharpened image obtained after sharpening as the image to be processed.

3. The image content extraction method according to claim 2, wherein the sharpening the first reverse image comprises:
   performing Gaussian filtering on the first reverse image to obtain a Gaussian blurred image of the first reverse image; and
   weighting pixel values of various second pixel points in the first reverse image and pixel values of pixel points, which are at same positions as the various second pixel points, in the Gaussian blurred image of the first reverse image to obtain the second sharpened image.

4. The image content extraction method according to claim 1, wherein the acquiring an image to be processed further comprises:
   acquiring an original image obtained by taking a picture of a writing tablet; performing image recognition on the original image to obtain a pixel region, corresponding to the writing tablet, in the original image; performing perspective transformation on the pixel region corresponding to the writing tablet to obtain a writing tablet image; sharpening the writing tablet image, and using a third sharpened image obtained after sharpening as the image to be processed; or
   acquiring an original image obtained by taking a picture of a writing tablet; performing image recognition on the original image to obtain a pixel region, corresponding to the writing tablet, in the original image; performing perspective transformation on the pixel region corresponding to the writing tablet to obtain a writing tablet image; reversing the writing tablet image to obtain a second reverse image of the writing tablet image; and sharpening the second reverse image, and using a fourth sharpened image obtained after sharpening as the image to be processed.

5. An image content extraction apparatus, comprising:
   an image acquisition unit, configured to acquire an image to be processed;
   a high-contrast retention unit, configured to perform high-contrast retention on the image to be processed to obtain a high-contrast image of the image to be processed;
   an image fusion unit, configured to perform image fusion on the image to be processed and the high-contrast image to obtain a fused image;
   a linear light enhancement unit, configured to perform linear light enhancement on the fused image to obtain a linear light-enhanced image; and
   an image content extraction unit, configured to use first pixel points, having pixel values located within a preset pixel value range, in the linear light-enhanced image as an image content of the image to be processed;
   wherein the linear light enhancement unit is also configured to:
   normalize various third pixel points in the fused image to obtain first normalized pixel values corresponding to the various third pixel points;
   determine linear light values of various fourth pixel points, wherein each of the various fourth pixel points is a third pixel point, having the first normalized pixel value located within a preset value range, among the various third pixel points; wherein the linear light value of each of the various fourth pixel points is a linear light value calculated on the basis of the first normalized pixel value of the fourth pixel point and a second normalized pixel value of a pixel point, which is located at a same position as the fourth pixel point, in the high-contrast image;
   respectively add the first normalized pixel values of the various fourth pixel points in the fused image with the linear light values corresponding to the various fourth pixel points to obtain third normalized pixel values respectively corresponding to the various fourth pixel points;
   perform value verification on the third normalized pixel values respectively corresponding to the various fourth pixel points, and determining, according to a verification result of the value verification, fourth normalized pixel values respectively corresponding to the various fourth pixel points to obtain the linear light-enhanced image.

6. A terminal, comprising a memory, a processor, and a computer program stored in the memory and runnable on the processor, wherein when executing the computer program, the processor implements an image content extraction method, the image content extraction method comprising:
   acquiring an image to be processed;
   performing high-contrast retention on the image to be processed to obtain a high-contrast image of the image to be processed;
   performing image fusion on the image to be processed and the high-contrast image to obtain a fused image;
   performing linear light enhancement on the fused image to obtain a linear light-enhanced image; and
   using first pixel points, having pixel values located within a preset pixel value range, in the linear light-enhanced image as an image content of the image to be processed;
   wherein the performing linear light enhancement on the fused image to obtain a linear light-enhanced image comprises:
   normalizing various third pixel points in the fused image to obtain first normalized pixel values corresponding to the various third pixel points;
   determining linear light values of various fourth pixel points, wherein each of the various fourth pixel points is a third pixel point, having the first normalized pixel value located within a preset value range, among the various third pixel points; wherein the linear light value of each of the various fourth pixel points is a linear light value calculated on the basis of the first normalized pixel value of the fourth pixel point and a second normalized pixel value of a pixel point, which is located at a same position as the fourth pixel point, in the high-contrast image;
   respectively adding the first normalized pixel values of the various fourth pixel points in the fused image with the linear light values corresponding to the various fourth pixel points to obtain third normalized pixel values respectively corresponding to the various fourth pixel points;

performing value verification on the third normalized pixel values respectively corresponding to the various fourth pixel points, and determining, according to a verification result of the value verification, fourth normalized pixel values respectively corresponding to the various fourth pixel points to obtain the linear light-enhanced image.

* * * * *